(12) United States Patent
Stokes, III et al.

(10) Patent No.: US 12,032,687 B2
(45) Date of Patent: Jul. 9, 2024

(54) COMMAND CLASSIFICATION USING ACTIVE LEARNING

(71) Applicant: MICROSOFT TECHNOLOGY LICENSING, LLC, Redmond, WA (US)

(72) Inventors: Jack Wilson Stokes, III, North Bend, WA (US); Jonathan Bar Or, Redmond, WA (US); Christian Seifert, Seattle, WA (US); Talha Ongun, Boston, MA (US); Farid Tajaddodianfar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 17/491,438

(22) Filed: Sep. 30, 2021

(65) Prior Publication Data
US 2023/0096895 A1    Mar. 30, 2023

(51) Int. Cl.
*G06F 21/55* (2013.01)
*G06F 18/214* (2023.01)
(Continued)

(52) U.S. Cl.
CPC .......... *G06F 21/554* (2013.01); *G06F 18/214* (2023.01); *G06F 21/54* (2013.01); *G06F 21/566* (2013.01); *G06N 20/00* (2019.01)

(58) Field of Classification Search
CPC .............................. G06F 18/214; G06F 21/554
See application file for complete search history.

(56) References Cited

U.S. PATENT DOCUMENTS 10,581,888 B1 *   3/2020   Agranonik .......... H04L 63/1466
10,956,477 B1 *   3/2021   Fang ....................... G06F 40/30
(Continued)

OTHER PUBLICATIONS

Siddiqui, et al., "Detecting Cyber Attacks Using Anomaly Detection with Explanations and Expert Feedback", In IEEE International Conference on Acoustics, Speech and Signal Processing, May 12, 2019, pp. 2872-2876.

(Continued)

*Primary Examiner* — Khang Do
(74) *Attorney, Agent, or Firm* — Scott Y. Shigeta; Newport IP, LLC

(57) ABSTRACT

The techniques disclosed herein enable systems to train a machine learning model to classify malicious command line strings and select anomalous and uncertain samples for analysis. To train the machine learning model, a system receives a labeled data set containing command line inputs that are known to be malicious or benign. Utilizing a term embedding model, the system can generate aggregated numerical representations of the command line inputs for analysis by the machine learning model. The aggregated numerical representations can include various information such as term scores that represent a probability that an individual term of the command line string is malicious as well as numerical representations of the individual terms. The system can subsequently provide the aggregated numerical representations to the machine learning model for analysis. Based on the aggregated numerical representations, the machine learning model can learn to distinguish malicious command line inputs from benign inputs.

20 Claims, 11 Drawing Sheets

(51) Int. Cl.
*G06F 21/54* (2013.01)
*G06F 21/56* (2013.01)
*G06N 20/00* (2019.01)

(56) References Cited

U.S. PATENT DOCUMENTS

| | | | | |
|---|---|---|---|---|
| 11,275,831 | B1* | 3/2022 | Aouad | G06N 20/10 |
| 2019/0273509 | A1* | 9/2019 | Elkind | H03M 7/4093 |
| 2019/0273510 | A1* | 9/2019 | Elkind | H03M 7/4093 |
| 2020/0092306 | A1* | 3/2020 | Jusko | G06F 16/285 |
| 2020/0106789 | A1* | 4/2020 | Boros | G06N 3/088 |
| 2020/0159916 | A1* | 5/2020 | Nguyen | G06F 11/3072 |
| 2020/0195683 | A1* | 6/2020 | Kuppa | H04L 63/1441 |
| 2020/0311262 | A1* | 10/2020 | Nguyen | G06F 21/554 |
| 2020/0314117 | A1* | 10/2020 | Nguyen | H04L 63/145 |
| 2020/0327225 | A1* | 10/2020 | Nguyen | G06N 3/084 |
| 2021/0097186 | A1* | 4/2021 | Mandal | G06F 21/552 |
| 2021/0099467 | A1* | 4/2021 | March | H04L 63/20 |
| 2021/0226990 | A1* | 7/2021 | Devi | H04L 63/1425 |
| 2022/0100857 | A1* | 3/2022 | Filar | G06N 5/01 |
| 2022/0156372 | A1* | 5/2022 | Harang | G06F 21/56 |
| 2022/0300609 | A1* | 9/2022 | Cotaie | G06N 7/01 |
| 2024/0056475 | A1* | 2/2024 | Kyadige | H04L 63/1425 |

OTHER PUBLICATIONS

Stokes, et al., "Aladin: Active learning of anomalies to detect intrusions", In Technical Report MSR-TR-2008-24, Mar. 4, 2008, 24 Pages.
Stokes, et al., Asking for a second opinion: Re-querying of noisy multi-class labels, In Proceedings o IEEE International Conference on Acoustics, Speech and Signal Processing (ICASSP), Mar. 20, 2016, 5 Pages.
Stokes, et al., "Neural classification of malicious scripts: A study with javascript and VBScript", In Repository of arXiv:1805.05603v1, May 15, 2018, 21 Pages.
Torres, et al., "Active learning approach to label network traffic datasets", In Journal of Information Security and Applications, vol. 49, Dec. 1, 2019.
Tuia, et al., "Active learning methods for remote sensing image classification", In Journal of IEEE Transactions on Geoscience and Remote Sensing, vol. 47, Issue 7, Apr. 7, 2009, 17 Pages.
Veeramachaneni, et al., "AI2 : Training a big data machine to defend", In Proceedings of IEEE 2nd International Conference on Big Data Security on Cloud (BigDataSecurity), Apr. 9, 2016, 13 Pages.
Wang, et al., "You are what you do: Hunting stealthy malware via data provenance analysis", In Proceedings of Network and Distributed Systems Security (NDSS) Symposium, Feb. 23, 2020, pp. 1-17.
Whittaker, et al., "Large-Scale Automatic Classification of Phishing Pages", In NDSS, vol. 10, 2010, 14 Pages.
Wueest, et al., "Living off the land and fileless attack techniques", In Internet Security Threat Report, Jul. 2017, 30 Pages.
Wueest, Candid, "PowerShell threats surge: 95.4 percent of analyzed scripts were malicious", Retrieved from: https://community.broadcom.com/symantecenterprise/communities/community-home/librarydocuments/viewdocument?DocumentKey=cbd24b89-1022-4fe8-800d-a362f3d4cf06&CommunityKey=1ecf5f55-9545-44d6-b0f4-4e4a7f5f5e68&tab=librarydocuments, Dec. 9, 2016, 3 Pages.
Yamin, et al., "Detecting Malicious Windows Commands Using Natural Language Processing Techniques", In International Conference on Security for Information Technology and Communications, Nov. 8, 2018, pp. 157-169.
Alasmary, et al., "ShellCore: Automating Malicious IoT Software Detection by Using Shell Commands Representation",, In repository of arXiv:2103.14221v1, Mar. 26, 2021, 12 Pages.
"International Search Report and Written Opinion Issued in PCT Application No. PCT/US22/041946", Mailed Date: Dec. 2, 2022, 13 Pages.
Tajiri, et al., "Detection of Malicious Powershell Using Word-Level Language Models", In Proceedings of Advances in Information and Computer Security—15th International Workshop on Security, IWSEC, Aug. 26, 2020, pp. 39-56.
"AppArmor", Retrieved from: https://web.archive.org/web/20210825062312/https://apparmor.net/, Aug. 25, 2021, 7 Pages.
"GTFOBins", Retrieved from: https://web.archive.org/web/20210913071126/https://gtfobins.github.io/, Sep. 13, 2021, 12 pages.
"Let's dig deeper on how cybercriminals use 'Living off the land' attack tactics", Retrieved from: https://cyware.com/news/lets-dig-deeper-on-how-cybercriminals-use-living-off-the-land-attack-tactics-cac5c132, Mar. 3, 2019, 3 Pages.
"Living Off The Land Binaries and Scripts (and also Libraries)", Retrieved from: https://web.archive.org/web/20200109143821/https://lolbas-project.github.io/, Retrieved On: Jan. 9, 2020, 4 Pages.
"Living-off-the-Land Attacks: What are they and Why Should they worry you?", Retrieved from: https://www.cytomic.ai/trends/living-off-the-land-attacks/, Aug. 13, 2019, 3 Pages.
"Out of sight but not Invisible: Defeating Fileless Malware with Behavior Monitoring, AMSI, and Next-gen AV", Retrieved from: https://www.microsoft.com/security/blog/2018/09/27/out-of-sight-but-not-invisible-defeating-fileless-malware-with-behavior-monitoring-amsi-and-next-gen-av/, Sep. 27, 2018, 27 Pages.
"What Are Fileless Malware Attacks and "Living Off the Land"? Unit 42 Explains", Retrieved from: https://web.archive.org/web/20210120105057/https://www.paloaltonetworks.com/cyberpedia/what-are-fileless-malware-attacks, Jan. 20, 2020, 5 Pages.
Almgren, et al., "Using active learning in intrusion detection", In Proceedings of 17th IEEE Computer Security Foundations Workshop, Jun. 30, 2004, 11 Pages.
Angluin, Dana, "Queries and concept learning", In Journal of Machine learning, vol. 2, Issue 4, Apr. 1988, pp. 319-342.
Arnaldo, et al., "eX2: a framework for interactive anomaly detection", In IUI Workshops, Mar. 20, 2019, 5 Pages.
Atlas, et al., "Training connectionist networks with queries and selective sampling", In Journal of Advances in neural information processing systems, vol. 2, 1990, pp. 566-573.
Beaugnon, et al., "Ilab: An interactive labelling strategy for intrusion detection", In International Symposium on Research in Attacks, Intrusions, and Defenses, Sep. 18, 2017, 21 Pages.
Biggio, et al., "Poisoning attacks against support vector machines", In Proceedings of the 29th International Conference on Machine Learning, Jun. 26, 2012, 8 Pages.
Bohannon, et al., "Revoke-Obfuscation: PowerShell Obfuscation Detection Using Science", In Blackhat USA, 2017, 20 Pages.
Breiman, Leo, "Random forests", In Journal of Machine Learning, vol. 45, Issue 1, Oct. 2001, pp. 5-32.
Chouvatut, et al., "Training set size reduction in large dataset problems", In Proceedings of International Computer Science and Engineering Conference, Nov. 23, 2015, 5 Pages.
Cohn, et al., "Active learning with statistical models", In Journal of Artificial Intelligence Research vol. 4, Mar. 1996, pp. 129-145.
Curtis, Hywel, "Beware of Cyber Attackers "Living off the Land"", Retrieved from: https://www.venafi.com/blog/beware-cyber-attackers-living-land, Aug. 12, 2019, 12 pages.
Debar, et al., "Fixed vs. variable-length patterns for detecting suspicious process behavior", In Proceedings of In European Symposium on Research in Computer Security, Sep. 16, 1998, pp. 1-15.
Frenay, et al., "Classification in the Presence of Label Noise: a Survey", In Journal of IEEE Transactions on Neural Networks and Learning Systems vol. 25, Issue 5, May 2014, pp. 845-869.
Görnitz, et al., "Active learning for network intrusion detection", In Proceedings of the 2nd ACM workshop on Security and artificial intelligence, Nov. 9, 2009, pp. 47-54.
Görnitz, et al., "Toward supervised anomaly detection", In Journal of Artificial Intelligence Research, vol. 46, Feb. 20. 2013, pp. 235-262.
Goudie, Mark, "Going Beyond Malware: The Rise of "Living off the Land" Attacks", Retrieved from: https://www.crowdstrike.com/blog/going-beyond-malware-the-rise-of-living-off-the-land-attacks/, May 7, 2019, 7 Pages.

(56) References Cited

OTHER PUBLICATIONS

Gu, et al., "BadNets: Identifying Vulnerabilities in the Machine Learning Model Supply Chain", In Repository of arXiv:1708.06733v1, Aug. 22, 2017, 13 Pages.

Hendler, et al., "Detecting Malicious PowerShell Scripts Using Contextual Embeddings", In the Repository of arXiv:1905.09538v1, May 23, 2019, 17 Pages.

Jagielski, et al., "Manipulating Machine Learning: Poisoning Attacks and Countermeasures for Regression Learning", In Proceedings of Symposium on Security and Privacy, May 20, 2018, 17 Pages.

Joachims, Thorsten, "Text Categorization with Support Vector Machines: Learning with Many Relevant Features", In Proceedings of the European Conference on Machine Learning, Apr. 21, 1998, 6 Pages.

Joulin, et al., "Bag of tricks for efficient text classification", In Repository of arXiv:1607.01759v1, Jul. 6, 2016, 5 Pages.

Lewis, et al., "A sequential algorithm for training text classifiers", In Proceedings of the 17th annual international ACM SIGIR conference on Research and development in information retrieval, Aug. 1, 1994, pp. 3-12.

Likarish, et al., "Obfuscated malicious javascript detection using classification techniques", In Proceedings of 4th International Conference on Malicious and Unwanted Software, Oct. 13, 2009, pp. 1-8.

Luo, et al., "Active learning to recognize multiple types of plankton", In Journal of Machine Learning Research vol. 6, Issue 4, Apr. 1, 2005, pp. 589-613.

Marceau, Carla, "Characterizing the behavior of a program using multiple length n-grams", In Proceedings of the Workshop on New Security Paradigms, Sep. 18, 2000, pp. 101-110.

Mikolov, et al., "Distributed Representations of Words and Phrases and their Compositionality", In Proceedings of the 27th Annual Conference on Neural Information Processing Systems, Dec. 5, 2013, 9 Pages.

Miller, et al., "Adversarial active learning", In Proceedings of the Workshop on Artificial Intelligent and Security Workshop, Nov. 7, 2014, pp. 3-14.

Paola, et al., "A hybrid system for malware detection on big data.", In Proceedings of IEEE Conference on Computer Communications Workshops, Apr. 15, 2018, pp. 45-50.

Pelleg, et al., "Active Learning for Anomaly and Rare-Category Detection", In Journal of Advances in Neural Information Processing Systems, Dec. 2004, 8 Pages.

Pereira, Anson Joel, "Tracking, Detecting, and Thwarting PowerShell-based Malware and Attacks", Retrieved from: https://www.trendmicro.com/vinfo/hk-en/security/news/cybercrime-and-digital-threats/tracking-detecting-and-thwarting-powershell-based-malware-and-attacks, Jun. 5, 2020, 24 Pages.

Rahhal, et al., "Deep learning approach for active classification of electrocardiogram signals", In Journal of Information Sciences, vol. 345, Jun. 1, 2016, 45 Pages.

Rai, Shubham, "Behavioral Threat Detection: detecting Living of Land Techniques", In Master's thesis University of Twente, Aug. 25, 2020, 61 Pages.

Ramos, Juan, "Using TF-IDF to Determine Word Relevance in Document Queries", In Proceedings of the first Instructional conference on machine learning, Dec. 3, 2003, 4 Pages.

Rashmi, et al., "DART: Dropouts meet Multiple Additive Regression Trees", In Journal of Artificial Intelligence and Statistics, Feb. 21, 2015, pp. 489-497.

Roy, et al., "Toward optimal active learning through sampling estimation of error reduction", In Proceedings of the Eighteenth International Conference on Machine Learning, Jun. 2001, 8 Pages.

Rusak, et al., "POSTER: AST-based deep learning for detecting malicious powershell", In In Proceedings of the ACM SIGSAC Conference on Computer and Communications Security, Oct. 15, 2018, pp. 2276-2278.

Schein, et al., "Active learning for logistic regression: an evaluation", In Journal of Machine Learning vol. 68, Issue 3, Oct. 1, 2007, pp. 235-265.

Schutt, et al., "Early Detection of Malicious Behavior in JavaScript Code", In Proceedings of the 5th ACM Workshop on Security and Artificial Intelligence, Oct. 19, 2012, pp. 15-24.

Sculley, et al., "Detecting adversarial advertisements in the wild", In Proceedings of the 17th ACM SIGKDD International conference on Knowledge discovery and data mining, Aug. 21, 2011, pp. 274-282.

Sculley, D., "Online active learning methods for fast label-efficient spam filtering", In Proceedings of Fourth Conference on Email and Anti-Spam, Aug. 2007, 8 Pages.

Settles, Burr, "Active Learning Literature Survey", In Technical Report 1648 of Computer Sciences, University of Wisconsin—Madison, Jan. 26, 2010, 67 Pages.

Seung, et al., "Query by Committee", In Proceedings of the fifth annual workshop on Computational learning theory, Jul. 1, 1992, pp. 287-294.

Shah, Anumeha, "Malicious JavaScript Detection using Statistical Language Model", In Thesis of San Jose State University, May 25, 2016, 70 Pages.

* cited by examiner

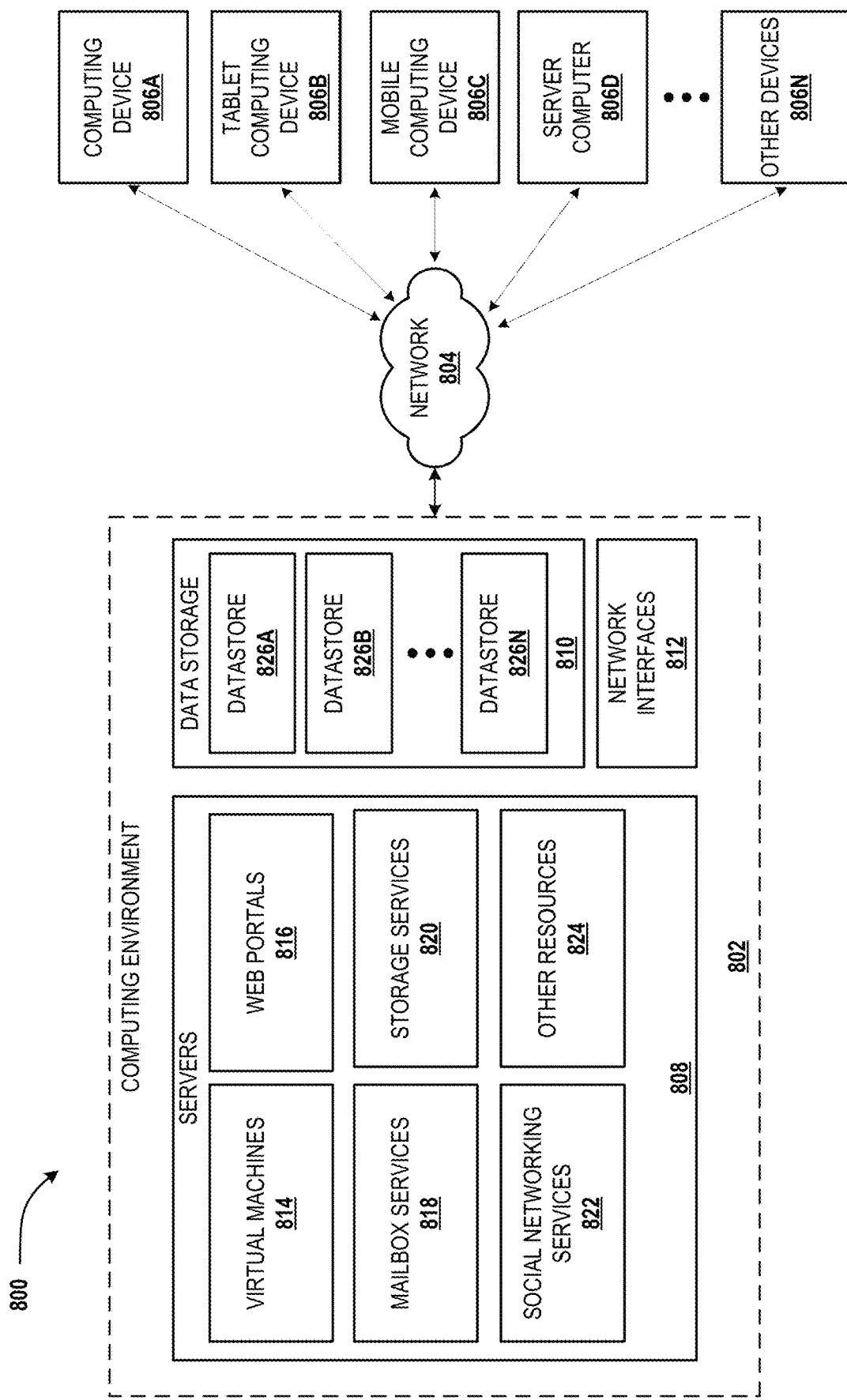

COMMAND CLASSIFICATION USING ACTIVE LEARNING

BACKGROUND

As more devices and services leverage the vast potential of network connections to expand upon and improve features, the security of computing systems has become of increasing concern for individual users and large organizations alike. The rapid introduction of connected devices from smart home products to cloud computing centers presents many new pathways for malicious actors to exploit. In various scenarios, a malicious actor wishing to infiltrate a system and gain access to critical data may employ a wide variety of malware techniques. Typically, these methods can create malicious files at the target system to execute programs that enable the attacker to steal guarded information, disrupt normal operations, or hijack computing resources.

To protect against malware, individual users and enterprises can deploy anti-virus software to detect and remove suspicious or malicious files. Anti-virus software can also actively monitor a system to prevent an attack such as by scanning a file prior to download or preventing access to suspicious websites. In addition, many enterprises and organizations utilize endpoint security methods to protect members and employees from potential security threats. For instance, endpoint security systems can enforce compliance to standard security policies and best practices through data encryption, virtual private networks, restricted access from endpoint devices and the like.

However, in response to improvements in anti-virus software and endpoint security programs, malicious actors have begun leveraging more and more creative ways to infiltrate systems and gain access to critical data. While some attackers may create malicious files that can be detected and removed by anti-virus software, advanced attackers can devise techniques to carry out an attack without creating any files and thus remain undiscovered. Such techniques are often referred to as fileless malware, in contrast to file-based malware mentioned above. For instance, an attacker may exploit programs that are legitimately installed at the target system to perform specific actions such as downloading and disguising malicious programs. In a specific example, an attacker may gain access to a program for creating and managing processes at a target system. Since the program is a legitimate part of the system, the attacker can maliciously exploit the program undetected by anti-virus software.

In this way, even highly advanced anti-virus applications cannot detect fileless malware and endpoint security systems need only be compromised once to pose serious threats to information security. In a specific example, an attacker may employ social engineering techniques to bait a system administrator into divulging shell access to the victim's computing device such as a laptop. Once infected, the attacker can subsequently obtain reconnaissance information on a victim network and perform lateral movement to other devices and servers on the same enterprise network. Using fileless malware techniques, the attacker can remain undetected in the network for extended periods of time and obtain confidential information from the target organization. Thus, there is an urgent need for enterprises to implement effective methods for detecting fileless malware attacks.

It is with respect to these and other considerations that the disclosure made herein is presented.

SUMMARY

The techniques disclosed herein improve the security and functionality of computer security systems by enabling one or more machine learning model to classify malicious command line inputs and select anomalous and uncertain samples for further analysis. To train the machine learning model, the system receives a labeled data set containing command line inputs that are known to be malicious or benign. Utilizing a term embedding model, the system can analyze individual terms within the command line input and generate aggregated numerical representations of each command line input for analysis by the machine learning model. The aggregated numerical representations can include various information such as term scores that represent a probability that an individual term of the command line input is malicious, numerical representations of the individual terms, the number of terms in the command line input. The system can subsequently provide the aggregated numerical representations to the machine learning model for analysis. Based on the aggregated numerical representations, the machine learning model can learn to distinguish malicious command line inputs from benign inputs.

As summarized above, despite significant advances in computer security applications and practices, attackers are increasingly utilizing more creative methods to avoid detection. For instance, an attacker with shell access to a victim device can exploit legitimate tools that are already installed on the device to execute an attack. These types of attacks are often referred to as Living-Off-The-Land (LOL) attacks as they rely upon existing parts of the operating system or other user-installed programs. In a specific example, an attacker may utilize an existing command-line program to escalate privileges, download malicious files, and encode or decode data to hide the malicious files. Since these programs tend to be integral parts of an operating system, they are typically white-listed and thus their usage does not cause an alert to be generated. In this way, an attacker can remain undetected within a compromised system for an extended period of time.

Therefore, the most effective way to counter LOL attacks is to detect them in real-time. However, existing approaches to real-time system monitoring typically utilize fixed rule sets to detect malicious behavior. As attackers adapt various methods to changing security practices, these rule sets can be rendered ineffective and may require constant updating by a security expert or other administrative entity. Naturally, for large organizations maintaining such methods can become infeasible and even outright impossible.

In another example, a system can collect many anomalous samples (e.g., millions). However, only a small portion of the collected samples may be anomalous. Thus, it is highly impractical for human experts or existing methods to analyze the collected data set to detect malicious samples. Furthermore, even approaches that utilized advanced methods such as machine learning to analyze the massive volume of data can prove ineffective as typical machine learning solutions require a large number of known samples to effectively train.

In contrast to existing solutions, by employing a term embedding model in conjunction with a machine learning model to classify and iteratively select command line samples for further analysis, the disclosed system can dramatically improve the security of various computer systems. In addition, by utilizing the methods disclosed herein, a machine learning model can be trained to accurately identify malicious command line inputs using only a small number of known or labeled samples. In this way, an organization can augment or replace existing solutions for detecting and mitigating LOL attacks as well as reduce the burden on human analysts or other experts.

As will be discussed in more detail below, a system for detecting LOL attacks can utilize term embedding techniques to translate command line text inputs to a numerical representation that can be analyzed by the system. An important consideration when processing text is the context surrounding individual terms which must be embedded in the numerical representation to accurately represent a given term. This can be accomplished using a variety of well-known natural language processing algorithms such as word2vec and fastText.

As mentioned above, the system can calculate a score for each term based on diverse factors such as an associated activity class, and previously analyzed samples. In various examples, by considering the activity class in calculating the score, the system can represent a term in different contexts. For instance, a particular term may be used maliciously in a specific activity class but merely a benign operation in another activity class. Furthermore, each term score can be updated over time as the system analyzes more and more samples thereby increasing the number of labeled samples.

Subsequently, the system can generate an aggregated numerical representation to represent the full command line string. To streamline analysis, the aggregated numerical representation can be of fixed length and include the numerical representations for each term of the command line string, a select number of term scores, as well as additional information derived from the command line string. For example, as will be discussed further below, the aggregated numerical representation can also include values derived from analysis of the numerical term representations such as a minimum, maximum, and average term value. In addition, the average term values can be calculated as a weighted average using the term scores to emphasize terms that are more likely to be malicious. The system can then utilize the aggregated numerical representations to train a machine learning model to distinguish between malicious and benign command line strings.

In addition, the system can also continually improve as the machine learning model processes additional iterations of unlabeled command line samples and receives labels from a human expert. For example, based on an initial labeled data set, a machine learning model may be unable to confidently identify an unlabeled sample (e.g., an uncertain sample). In response, the system can provide the uncertain sample to an analyst such as a human security expert for more detailed analysis and labelling. Based on the newly labeled sample, the machine learning model can proceed to readily identify similar samples and enable the system to take action accordingly.

Furthermore, the disclosed system can enable organizations to uncover novel attack methods through analysis of anomalous samples. For instance, the machine learning model may predict a certain activity class for a given unlabeled sample. However, while the sample falls within the activity class, it may differ significantly from other samples within the activity class in various aspects. In response, the machine learning model can select the anomalous sample and provide it to a human expert for labeling. As will be elaborated upon below, the anomalous sample may be determined to be a new form of the predicted activity class. For instance, the anomalous sample may originate from a particular threat actor group. Accordingly, the system can define a subclass of the existing activity class to provide additional granularity and specificity when analyzing various unlabeled samples.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 8 is a diagram illustrating a distributed computing environment capable of implementing aspects of the techniques and technologies presented herein.

DETAILED DESCRIPTION

Figure 1:
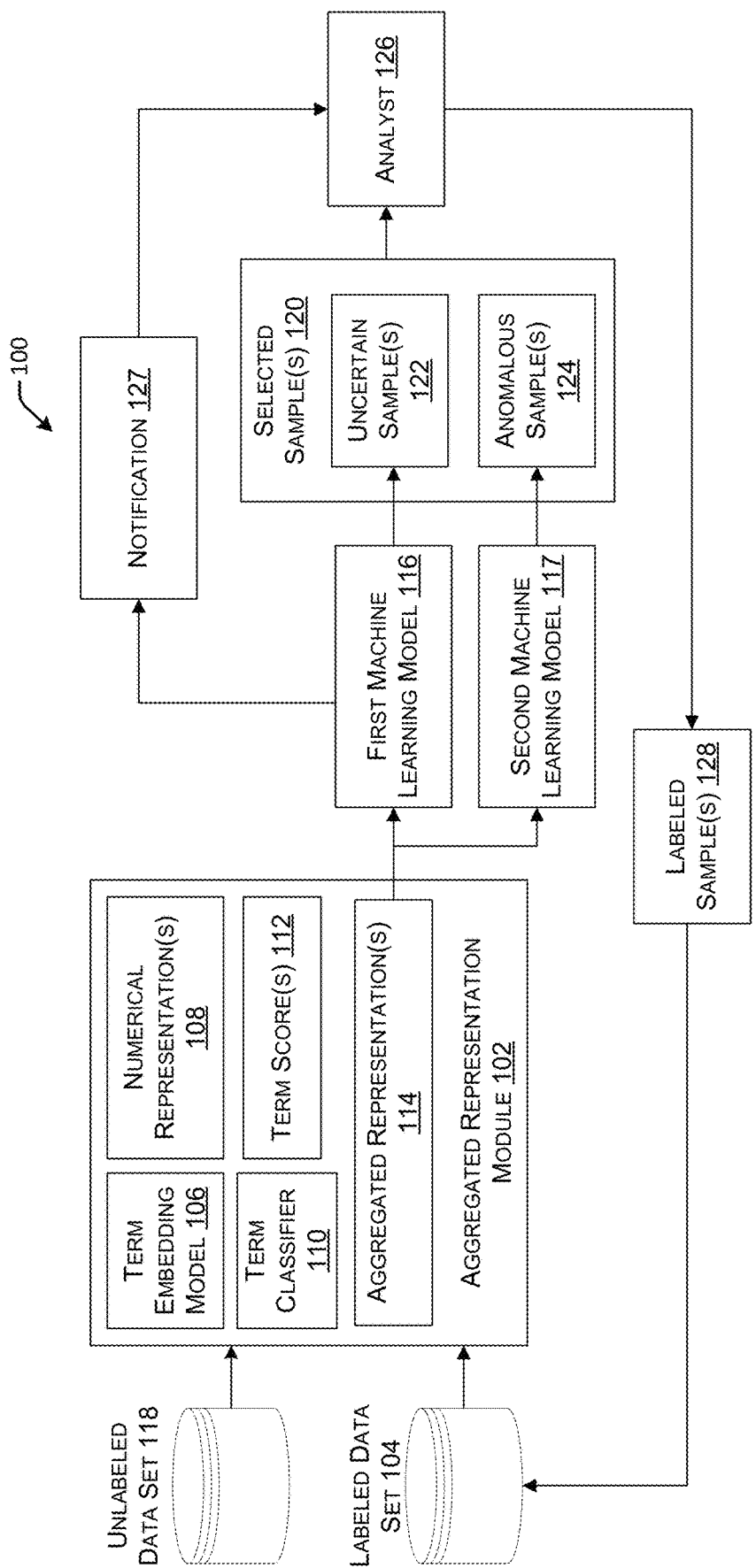
FIG. 1 is an example architecture diagram illustrating a security system utilizing a term embedding model and a machine learning model to analyze command line strings to detect malicious inputs.

The techniques describe herein provide systems for optimizing the use of computing resources and to improve the operation of security systems that enable detection and mitigation of LOL attacks. Security systems can include computing resources, storage, and other components for executing applications, storing data, and the like. Despite advances in antivirus software and other security practices, malicious actors have begun leveraging more sophisticated methods such as fileless malware to avoid detection. As fileless malware such as LOL attacks increase in frequency it is vital that organizations implement solutions to counter these types of attacks. Detection of LOL attacks can be achieved using real-time monitoring methods to screen command line inputs to a computing system. In one example, real-time monitoring can be implemented using a fixed rule set that enables the computing system to automatically flag suspicious command line inputs. In another example, logs of command line inputs can be collected and manually analyzed by various human experts such as a security analyst.

However, as mentioned above, fixed rule sets may prove ineffective in detecting malicious command line inputs as attackers may simply adapt their approach to circumvent the rules. Thus, a system engineer or other administrative entity must constantly modify the rule set in response to novel attacks which is naturally infeasible especially for a large organization. Similarly, for organizations whose daily operations may involve thousands or even millions of command line inputs, manually analyzing command line inputs can be wholly impractical. Without a more efficient and accurate process for analyzing command line inputs, security can be deeply compromised.

To more effectively defend against LOL attacks, organizations can utilize a term a term embedding model in conjunction with a machine learning model to automatically analyze and classify command line inputs. It should be understood that command line inputs can be any string of text that is input via a command line interface and may be entered manually or automatically. As will be elaborated on below, the term embedding model can calculate a term score for each individual term of a command line input to represent the probability of the command line input being malicious.

The disclosed techniques address several technical problems associated with detection and mitigation of LOL attacks. As discussed above, existing approaches are often impractical especially in computing systems belonging to large organizations that process a high volume of command line inputs. In a specific example, an organization may employ a build server (e.g., a continuous integration server) to enable a large, distributed team of developers to compile code efficiently and conflict-free. Naturally, normal operations for the build server can involve receiving a large number of command line inputs from many sources that may also be geographically dispersed. As mentioned above, existing systems that use a simple rule set or manual analysis to detect malicious command line strings may prove ineffective as attackers adapt their approach in addition to the large volume of inputs. By employing a term embedding model and machine learning model to analyze and classify command line inputs, the disclosed system improves the efficacy of security systems for defending against LOL attacks. In this way, the security of computing systems is greatly enhanced.

In another example of the technical benefit of the present disclosure, the techniques described herein improve the performance of computing systems. This is possible due to the combination of the term embedding model and machine learning model to analyze command line inputs more efficiently as mentioned above and discussed further below. By eliminating the need for ever expanding rule sets or excessive manual effort of existing approaches, the disclosed system can improve performance by conserving computing resources as well as network resources.

Various examples, scenarios, and aspects that enable secure multi-tenant subscription sharing are described below with reference to FIGS. 1-8. For the purposes of discussion, "command line string," "command line input," and "sample" may be used interchangeably below.

FIG. 1 illustrates an example system 100 in which an aggregated representation module 102 utilizes a labeled data set 104 and a term embedding model 106 to generate numerical representations 108. Labeled data set 104 can contain command line strings that are labeled as malicious or benign. As will be discussed below, numerical representations 108 can be numerical representations of each natural language term of a command line string to enable analysis by a term classifier 110. In addition, a numerical representation 108 can also be referred to as an embedding. Term classifier 110 can subsequently calculate a term score 112 for each numerical representation 108. Each term score 112 can quantitatively represent a probability that the term associated with a numerical representation 108 is malicious. Based on the numerical representations 108 and term scores 112, aggregated representation module 102 can generate an aggregated representation 114. Like numerical representations 108, aggregated representation 114 can be a numerical representation of a whole command line string that enables analysis by a first machine learning model 116 and/or a second machine learning model 117.

As will be elaborated upon below, the system 100 can utilize aggregated representations 114 generated based on labeled data set 104 to train a first machine learning model 116 to analyze and classify unlabeled command line strings from unlabeled data set 118. In addition, the system 100 can utilize first machine learning model 116 in conjunction with a second machine learning model 117 to further analyze unlabeled command line strings. In contrast to labeled data set 104, unlabeled data set 118 can contain command line strings that have not been previously labeled as malicious or benign. For instance, labeled data 104 may comprise command line strings that have been previously analyzed by the system 100 or manually analyzed and labeled. Conversely, unlabeled data set 118 can comprise command line strings that are automatically collected during live operation of a computing system such as the build server mentioned above. It should be understood that first machine learning model 116 and second machine learning model 117 can be implemented using any suitable method such as a boosted decision tree, a linear logistic regression classifier, a naïve Bayes model, and the like.

Furthermore, once unlabeled command line strings are classified by first machine learning model 116, the system 100 can perform further analysis using first machine learning model 116 and second machine learning model 117. Based on analysis of additional aggregated representations 114 generated from unlabeled data set 118, first machine learning model 116 and second machine learning model 117 can generate a set of selected samples 120 that may require additional analysis. As will be discussed below, selected samples 120 can include uncertain samples 122 identified by first machine learning model 116 as well as anomalous samples 124 identified by second machine learning model 117. Since detection of uncertain samples 122 may require a different approach to detecting anomalous samples 124, the system 100 may be configured to utilize a first machine learning model 116 that is different from second machine learning model 117. In a specific example, first machine learning model 116 may be implemented as a boosted decision tree while second machine learning model 117 can be a naïve Bayes model.

In various examples, a particular sample may be deemed an uncertain sample 122 if it lies near a decision boundary.

Stated another way, when classifying samples from unlabeled data set 118, first machine learning model 116 may determine that a given sample bears resemblance to more than one activity class. Thus, first machine learning model 116 may be unable to confidently classify the given sample. Accordingly, first machine learning model 116 can select the sample as an uncertain sample 122 for additional analysis and correction. In another example, machine learning model 116 may confidently place a particular sample within an activity class. However, as will be discussed below, second machine learning model 117 may detect that the sample may lie outside a threshold distance from known samples (e.g., benign command line inputs). Second machine learning model 117 can accordingly select the sample as an anomalous sample 124 for analysis indicating that anomalous sample 124 is potentially malicious. By selecting uncertain samples 122 for labeling, the system 100 can receive corrections and adjust accordingly. In addition, by selecting anomalous samples 124, the system 100 can enable detection of novel attack methods, specific threat actor groups, or specific usage types of known malicious activity. Furthermore, selecting anomalous samples 124 can also enable detection of additional classes of benign activity as well as more specific subclasses of known benign activity.

In various examples, the system 100 can provide selected samples 120 to an analyst 126 for labeling. Analyst 126 can be a human user such as a security engineer, system administrator and the like. Analyst 126 can perform additional analysis on selected samples 120 to accurately label uncertain samples 122 and confirm if an anomalous sample 124 is indeed malicious. Accordingly, analyst 126 can provide labeled samples 128 to the system 100 expand the labeled data set 104. In this way, the system 100 can update term embedding model 106 and term classifier 110 with new data and adjust term scores 112 which can modify how aggregated representations 114 are generated. Using these adjustments, the system 100 can continually train and update first machine learning model 116. Thus, as labeled data set 104 expands with each iteration first machine learning model 116 can improve accuracy in detecting malicious command line strings as well as detect more attack methods. It should be understood that labeling of command line strings can be performed automatically by the system 100 or manually such as by analyst 126.

In addition, first machine learning model 116 and/or second machine learning model 117 can be configured to generate a notification 127 to alert analyst 126 to suspicious or malicious activity. For example, first machine learning model 116 may receive a sample from unlabeled data set 118 that can be quickly and confidently identified as an attack. To enable a rapid and effective response to mitigate the attack, first machine learning model 116 can generate a notification 127. To further enhance the security response, notification 127 may also include information regarding the type of attack. For instance, first machine learning model 116 may detect a data exfiltration attempt in progress. Accordingly, notification 127 can reflect the identity of the attack type to enable analyst 126 to carry out appropriate measures for various attack types. In another example, notification 127 can include multiple classes of malicious activity that are ranked by likelihood based on analysis and prediction by first machine learning model 116. In this way, notification 127 can be a multiclass output that provides maximal context and coverage for a potential attack.

Furthermore, notification 127 can also enable the system 100 to automatically take action in response to detecting malicious activity. In a specific example, notification 127 may indicate that an attacker has gained secure access a particular user device (e.g., a laptop) and is attempting to move laterally within a network connected to the user device. Such lateral movement can enable the attacker to compromise other connected devices as well as the greater network infrastructure. In response, the system 100 can disable network access from the compromised device to prevent further malicious activity. In another example, notification 127 can indicate that a certain user identification (e.g., an employee's work account) is compromised such as through password theft. In response, the system 100 can disable any network access associated with the user identification regardless of which device the user identification is attempting to access network from.

Figure 2A:
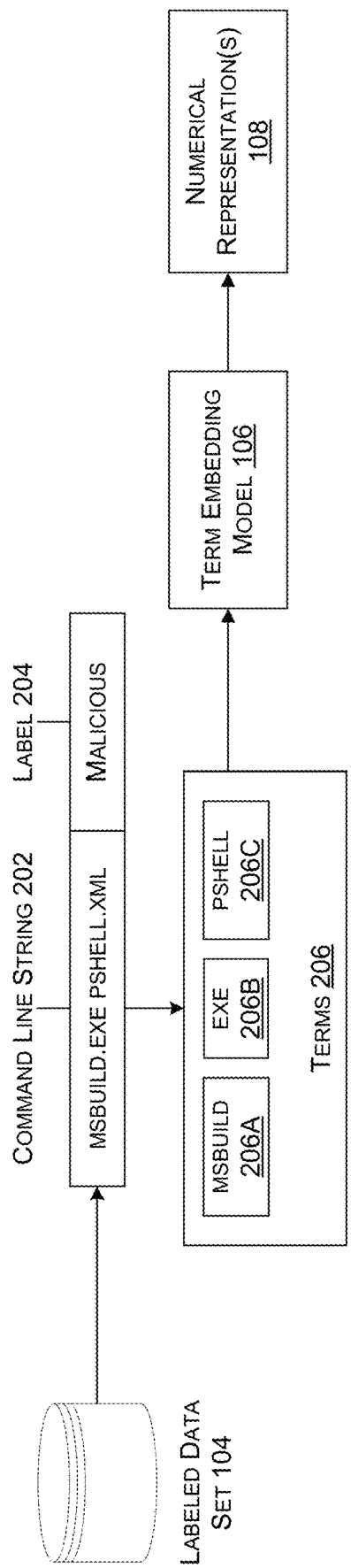
FIG. 2A illustrates a first step in a process for analyzing command line strings to detect malicious inputs.

Proceeding to FIG. 2A, additional details on term embedding model 106 and the generation of numerical representations are shown and described. As mentioned above, to enable active detection and mitigation of LOL attacks, the system 100 can train a first machine learning model 116 using a labeled data set 104 which may contain a plurality of command line strings 202 having an associated label 204 indicating whether the command line string 202 is malicious. As shown in FIG. 2A, each command line string 202 can comprise several terms 206. System 100 can parse each command line string 202 in labeled data set 104 and separate each command line string 202 into a sequence of individual terms. In various examples, a term 206 can be any substring of command line string 202 that is separated by a delimiter such as a period, a colon, a hyphen, and so forth. For instance, as illustrated in FIG. 2A, command line string 202 comprises four terms 206A-206C, msbuild 206A, exe 206B, and pshell 206C. It should be understood that command line string 202 as illustrated in FIG. 2 is merely for the purposes of discussion and that command line string 202 can comprise any number of terms 206 and may employ any combination of delimiters for each term 206.

Once command line string 202 has been transformed into its constituent terms 206, each term 206A-206D can be provided to term embedding model 106 for translation into a corresponding numerical representation 108. As mentioned above, translating natural language terms 206 into numerical representations 108 is vital for enabling analysis by various computational methods such as term classifier 110 and first machine learning model 116. Term embedding model 106 can employ a wide variety of methods for generating numerical representations 108 based on terms 206. For instance, term embedding model 106 may construct a simple numerical representation 108 for a given term 206A where each term 206A maps to a number or sequence of numbers. Term embedding model 106 may additionally give weight to the frequency of a term 206A as it appears in labeled data set 104 with rarer terms 206 receiving greater weight. To more accurately represent each term 206A, term embedding model 106 can consider the contextual information of each term 206A when generating an associated numerical representation. For example, term embedding model 106 may assigned a numerical representation 108 to term exe 206B in command line string 202 as illustrated in FIG. 2A. However, for a different command line string 202 that also includes term exe 206B, term embedding model 106 may assign a different numerical representation 108 since term exe 206B is being used in a different context. In this way, term embedding model 106 can represent a command line string 202 more accurately than with a simply mapped numerical representation 108.

Figure 2B:
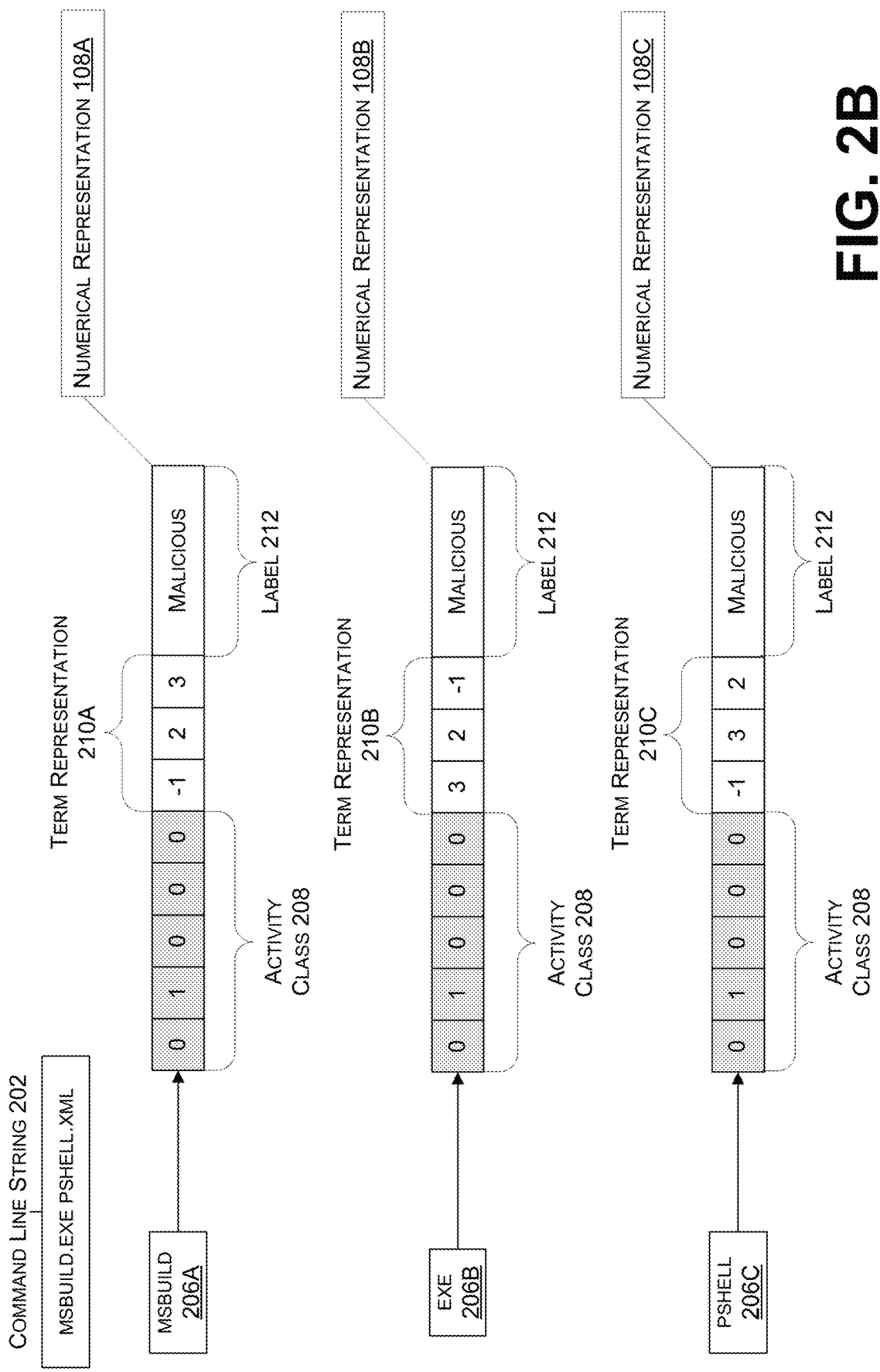
FIG. 2B illustrates additional details in the first step in the process for analyzing command line strings to detect malicious inputs.

Turning now to FIG. 2B, additional aspects of numerical representations 108 are shown and described. As discussed above, term embedding model 106 generates a numerical representation 108 for each term 206A-206D. As shown in FIG. 2B, an individual numerical representation 108A can include several information fields such as activity class 208, term representation 210A, and a label 212. It should be understood that numerical representations 108A-108C as illustrated in FIG. 2B are merely for the purposes of discussion and can include additional information fields as appropriate.

As mentioned, an individual numerical representation 108A can include an activity class 208 that indicates a program that command line string 202 containing term 206A is attempting to execute. In the example illustrated in FIGS. 2A-2B, command line string 202 is attempting to execute msbuild.exe represented by terms 206A and 206B. For the purposes of discussion, activity class 208 is illustrated using a one-hot encoding scheme. However, it should be understood that activity class 208 can be represented using any suitable encoding scheme.

Numerical representation 108A also includes term representation 210A to represent the associated term 206A. By including both activity class 208 and term representation 210A in numerical representation 108A the system 100 can represent a given term 206A in many different contexts. For example, a given term 206C when utilized in a command line string 202 in a first activity class 208 may be malicious while utilizing the term in a different command line string 202 in another activity class 208 can be benign.

Furthermore, numerical representation 108A can include a label to indicate whether associated term 206A is part of a malicious command line string 202. It should be understood that a numerical representation 108A may not always include a label 212. For instance, when the system 100 begins analyzing command line strings 202 from unlabeled data set 118, numerical representations 108 generated from unlabeled data set 118 will naturally lack a label 212.

Figure 3:
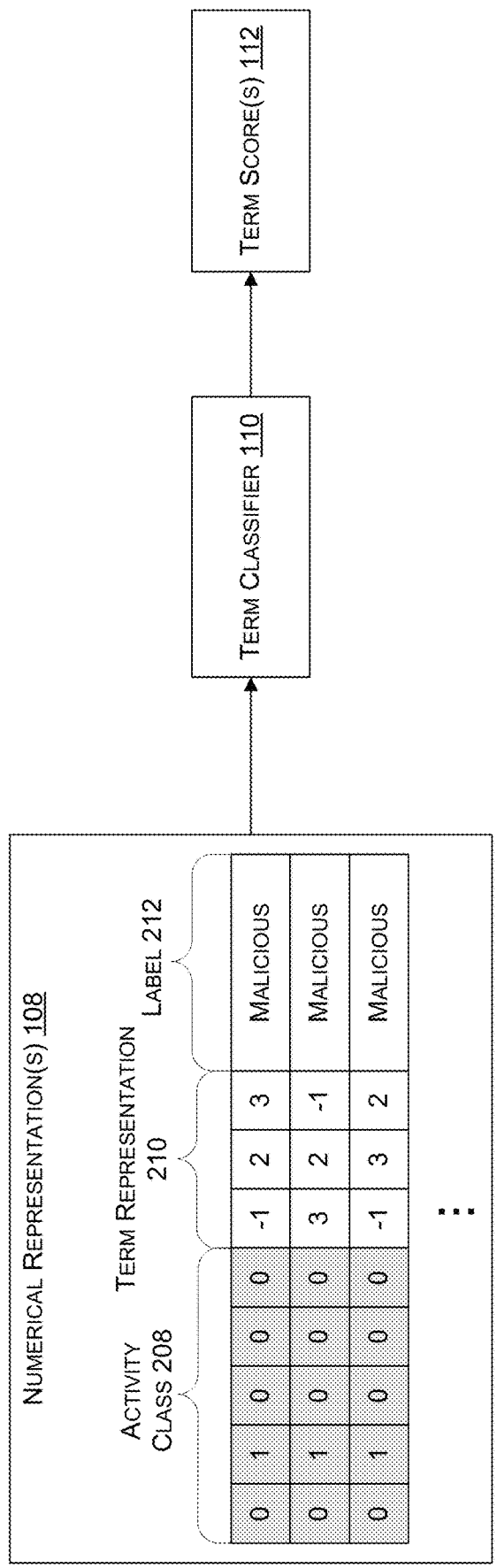
FIG. 3 illustrates a second step in the process for analyzing command line strings to detect malicious inputs.

Turning now to FIG. 3, numerical representations 108 for each term 206 can be provided to term classifier 110 to calculate a term score 112 for each numerical representation 108. As discussed above, each term score 112 can represent a probability that an associated term 206A is malicious where a comparatively high term score 112 can represent a greater probability that a given term is malicious. Term classifier 110 can be implemented with a wide variety of approaches. In some examples, term classifier 110 may be a machine learning model that is different from first machine learning model 116. For instance, term classifier 110 can be a random forest classifier while first machine learning model 116 may be a boosted decision tree or a linear logistic regression classifier. It should be understood that term classifier 110 may be implemented using any suitable technology and is not restricted to a machine learning classifier.

In addition, term classifier 110 can calculate term scores 112 using a variety of methods. In a specific example, term classifier 110 may trained to recognize various terms 206 using labeled data set 104. Since terms 206 that are extracted from labeled data set 104 are known to be malicious or benign, term classifier 110 can construct a robust predictive model. To train term classifier 110, term classifier 110 can receive a plurality of numerical representations 108 which are generated as discussed above with respect to FIG. 2A through FIG. 2B. Based on the numerical representations 108 term classifier 110 can calculate a probability that a term 206A is malicious for each instance of the term 206A. This process can be repeated for any number of numerical representations 108 as well as across multiple sets of numerical representations 108 in which term classifier 110 may encounter the same term several times. To determine a term score 112 for a term 206A, term classifier 110 can then calculate an average probability across all instances of the term 206A that term classifier 110 encountered.

Furthermore, in the example illustrated in FIG. 3, each numerical representation 108 can include both activity class 208 as well term representation 210. In this way, each term score 112 can represent the probability that a term 206A is malicious when paired with an activity class 208. As discussed above, a term 206A may be malicious when used in one context but benign in another. By calculating a term score for each combination of term 206A and activity class 208, term classifier 110 can enable fine grain monitoring of command line strings 202 thereby increasing accuracy in detecting potential attacks. However, it should be understood that term classifier 110 may be alternatively configured to calculate term scores 112 for a term 206A without considering activity class 208.

Furthermore, term scores can be updated over time as the system analyzes more command line inputs and encounters more instances of a particular term 206A. For instance, based on labeled data set 104, the system 100 may determine that a certain term 206A is not very likely to be malicious. Accordingly, the term may be assigned a low term score 112 initially. However, the term 206A may begin to see increased usage in malicious command line strings 202. As such, the system 100 may increase the term score 112 for term 206A to indicate that the term 206A is now more likely to be malicious.

Figure 4:
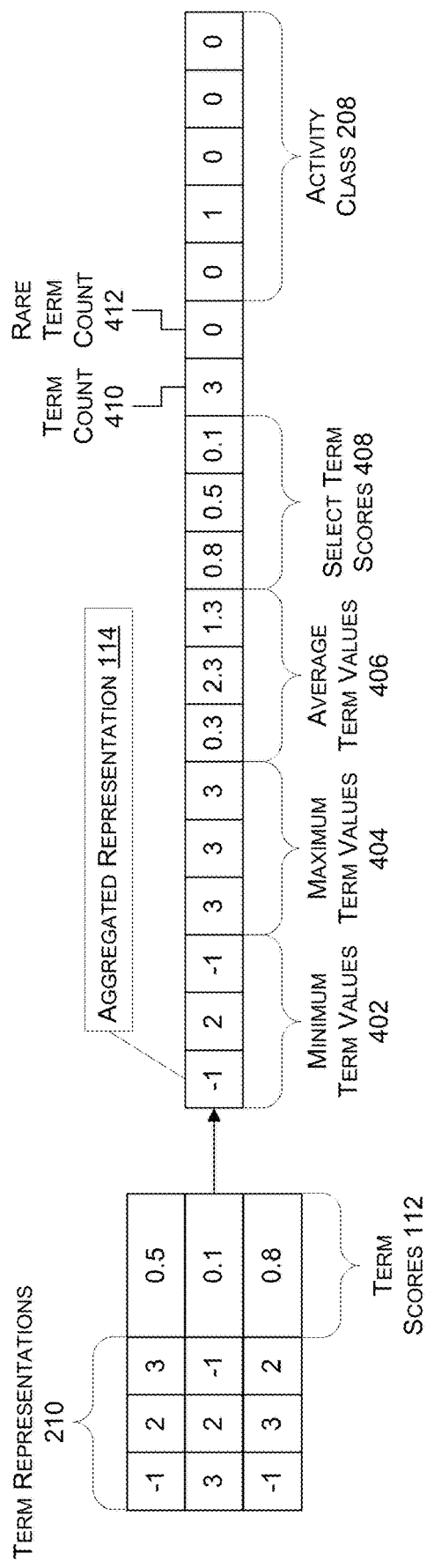
FIG. 4 illustrates a third step in the process for analyzing command line strings to detect malicious inputs.

Proceeding to FIG. 4, aspects of a process for generating an aggregated representation 114 to train first machine learning model 116 and second machine learning model 117 are shown and described. Utilizing the numerical representations 108 and term scores 112, aggregated representation module 102 can generate an aggregated representation 114. As mentioned above, aggregated representation 114 is a representation of a command line string 202 that is translated for processing and analysis by a first machine learning model 116 and a second machine learning model 117. However, various command line strings 202 may contain a different number of terms 206. In one example, aggregated representation module 102 may generate an aggregated representation 114 by simply grouping all the numerical representations 108 and term scores 112 of a command line string 202 together. However, this may introduce unnecessary complexity when providing the aggregated representations 114 to first machine learning model 116 or second machine learning model 117 and hinder performance. Conversely, to streamline the process of training as well as operation of first machine learning model 116 and second machine learning model 117, aggregated representation module 102 can represent each command line string 202 with a fixed length without omitting or including extraneous information.

To generate a fixed-length aggregated representation 114, aggregated representation module 102 can perform analysis on the term representations 210 and term scores 112 such as minimum, maximum, and average pooling. As shown in FIG. 4, aggregated representation 114 includes minimum term values 402, maximum term values 404, and average term values 406 which can be calculated based on the provided term representations 210. It should be understood that while the example illustrated in FIG. 4 includes three minimum term values 402, maximum term values 404, and average values 406, aggregated representation 114 can include any number of term values 402-406 to suit various applications and systems. Furthermore, aggregate representation module 102 can utilize term scores 112 to weight average-pooling when calculating the average term values 406. In this way, term classifier 110 can more clearly identify malicious terms 206 in situations where terms 206 with a high term score 112 are more likely to be malicious.

Furthermore, aggregated representation 114 can include select term scores 408. Select term scores 408 can be selected in a variety of ways. For example, selected term scores 408 may be the highest term scores 112 calculated by term classifier 110 for a command line string 202. Alternatively, select term scores 408 can be the lowest term scores 112. In another example, select terms scores 408 can be selected based on an associated term 206A. For instance, an analyst 126 or the system 100 may identify a particular term 206 as warranting special attention. Accordingly, aggregate representation module 102 can include term scores 112 that pertain to the term 206. In still another example, the system 100 may define a threshold term score. Term scores 112 that satisfy the threshold term score can then be eligible for inclusion in the aggregated representation 114. It should be understood that these examples are only for the sake of discussion and may be implemented individually or together in an embodiment of the present disclosure.

Aggregated representation 114 can also include a term count 410 as well as a rare term count 412. Term count 410 can indicate the number of terms 206 in a command line string 202. As shown in the example of FIG. 4, term classifier 110 can provide three term scores 112 and corresponding term representations 210. Accordingly, term count 410 is shown as three. Similarly, rare term count 412 can indicate the number of terms 206 in a command line string 202 that appear infrequently in labeled data set 104. Rare terms 206 can be identified in a variety of ways. For instance, term classifier 110 may rank individual terms 206A by frequency while processing command line strings 202. In another example, the system 100 may be configured with a threshold number of occurrences. If a term 206A does not satisfy the threshold, the term 206A can accordingly be designated a rare term. In this way, the system 100 can reduce the number of unique terms 206 that must be recorded thereby conserving computing resources. In addition, by including term count 410 and rare term count 412 in the aggregated representation 112 system 100 can readily identify some characteristics of malicious behavior. For instance, an abnormally long command line string 202 may be more likely to be malicious. Similarly, a command line string 202 with a high rare term count 412 can be detected by the system 100 as suspicious. Finally, aggregated representation 114 can include activity class 208 to streamline identification by first machine learning model 116 and second machine learning model 117. Accordingly, system 100 may define a threshold term count and a threshold rare term count to quickly identify suspicious command line strings 202.

Furthermore, the system 100 can be configured with a set of predetermined activity classes. In a specific example, a predetermined activity class may be a particular type of attack or originate from a particular attacker or threat actor group. Accordingly, if a certain aggregated representation 114 includes an activity class 208 that matches a predetermined activity class, the command line string 202 associated with aggregate representation 114 can be readily identified as suspicious or malicious.

As discussed above with respect to FIG. 1, aggregated representation module 102 can provide a plurality of aggregated representations 114 to a machine learning model for training. By utilizing the aggregate representations 114, first machine learning model 116 can predict whether a command line string 202 is benign or belongs to a malicious activity class 208. Once trained, first machine learning model 116 can begin processing command line strings 202 from unlabeled data set 118. After predictively classifying unlabeled command line strings 202, first machine learning model 116 and second machine learning model 117 can generate selected samples 120 including both uncertain samples 122 and anomalous samples 124 for further analysis by analyst 126 to expand the labeled data set 104 thereby enhancing accuracy. It should be understood that first machine learning model 116 and second machine learning model 117 can be implemented using any suitable machine learning approach such as a boosted decision tree, a linear logistic regression classifier, a naïve Bayes model, and the like.

Figure 5A:
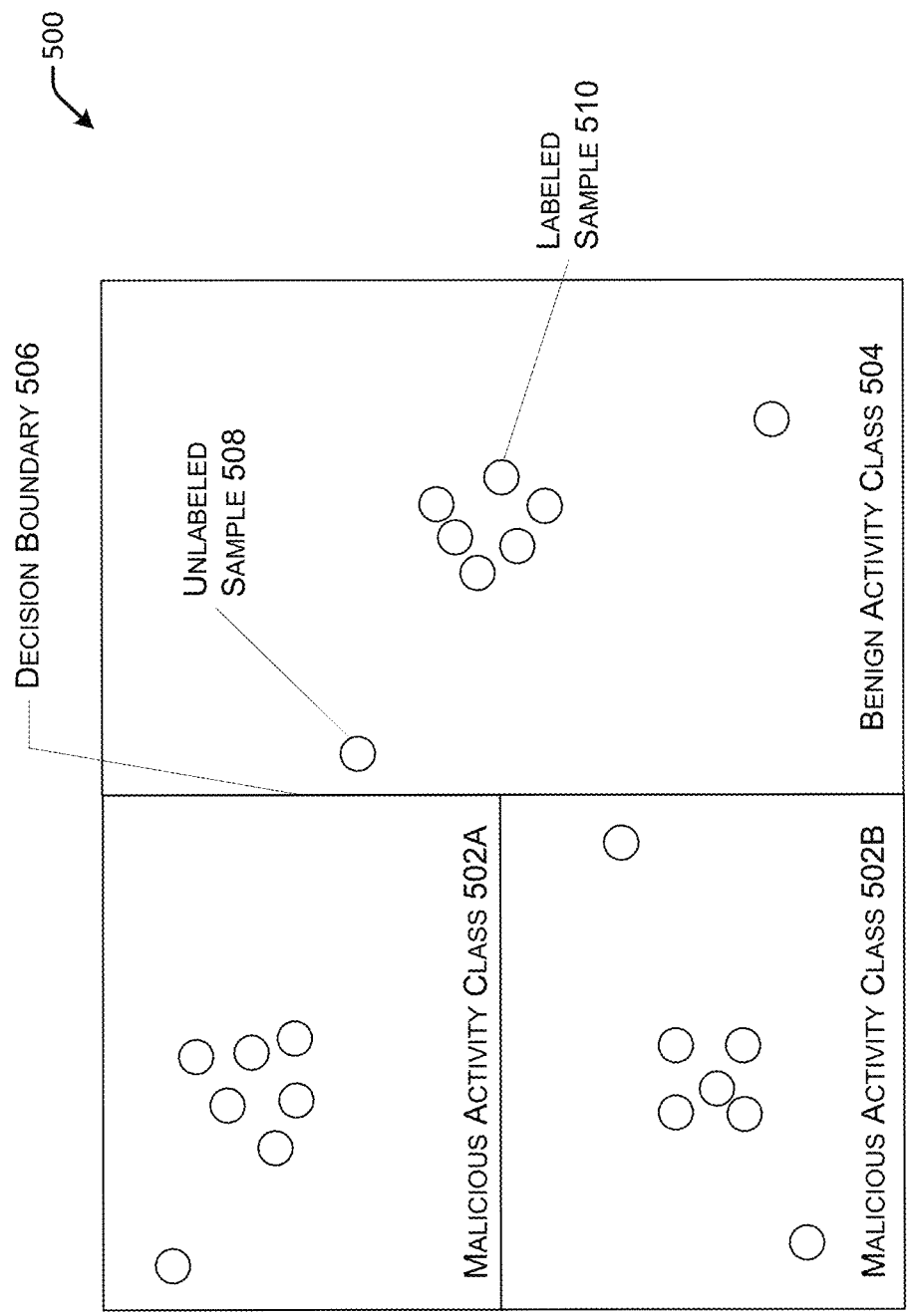
FIG. 5A illustrates an example decision space containing a plurality of command line samples with decision boundaries determined by a machine learning model.
Figure 5B:
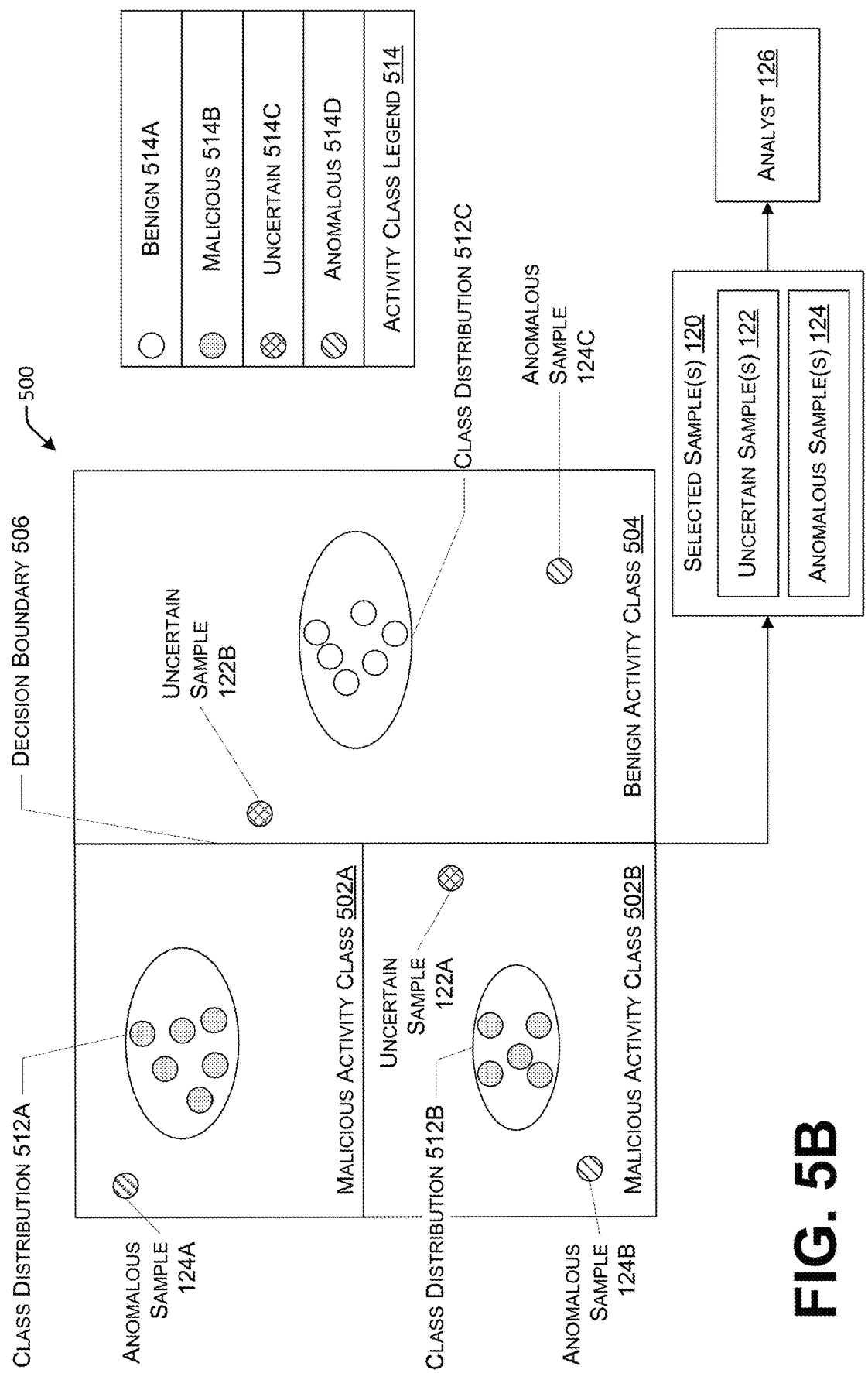
FIG. 5B further illustrates the example decision space with classification of samples assigned by the machine learning model.
Figure 5C:
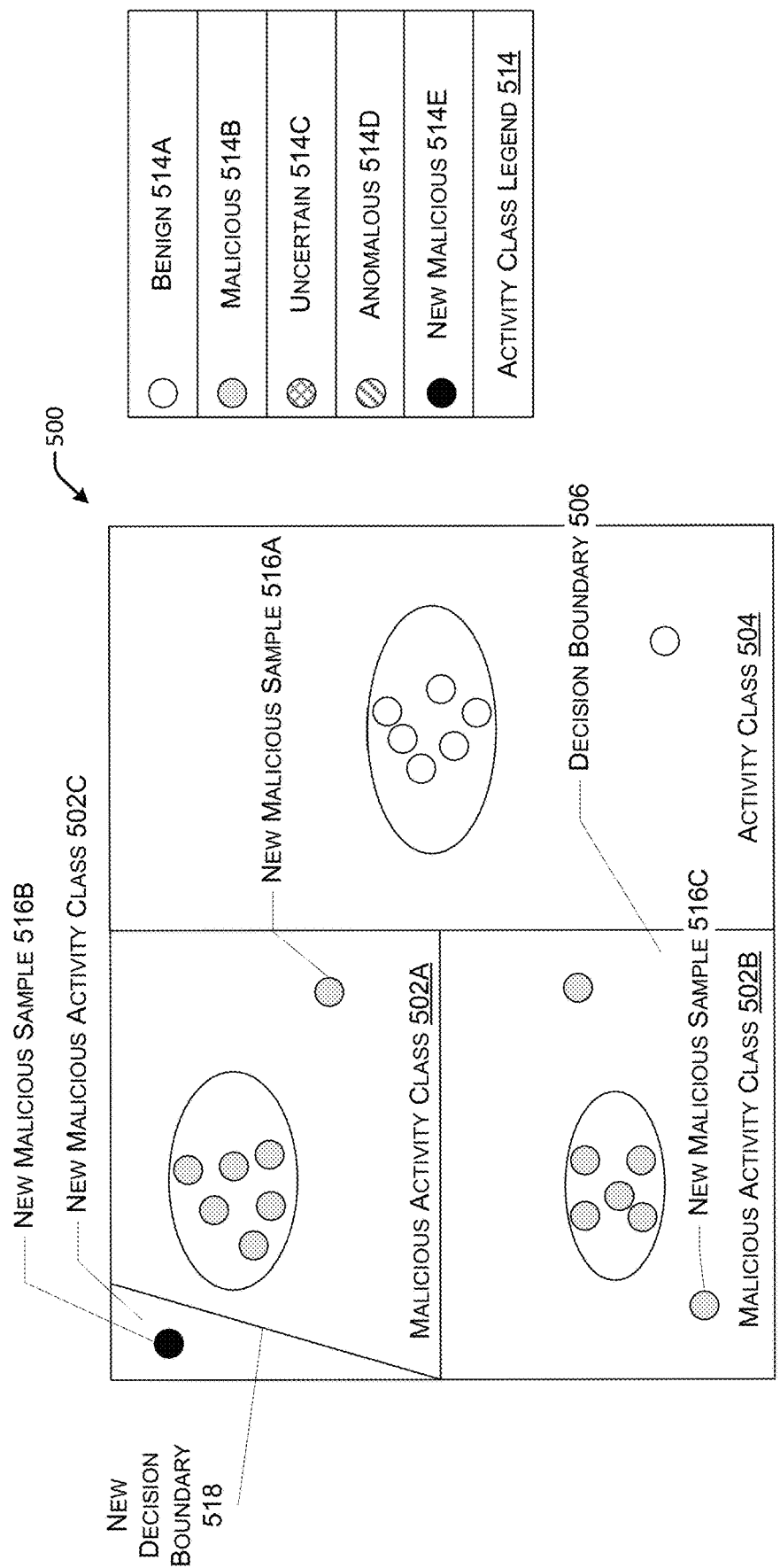
FIG. 5C further illustrates the example decision space with additional decision boundaries determined through further analysis by the machine learning model.

Turning now to FIG. 5A, aspects of a decision space 500 generated by first machine learning model 116 for classifying unlabeled command line strings 202 are shown and described. As mentioned above, once trained using the aggregated representations 114 generated from labeled data set 104, first machine learning model 116 can begin classifying unlabeled samples into malicious activity classes 502A-502B and a benign class 504. As shown in FIG. 5A, the decision space 500 can be represented graphically wherein malicious activity classes 502A-502B and benign activity class 504 are separated by a decision boundary 506. Individual unlabeled samples can be placed within decision space 500 based on a confidence level assigned to each prediction by first machine learning model 116. It should also be understood that decision space 500 of FIGS. 5A-5C is merely illustrative and that decision space 500 can include any number of malicious activity classes 502 or benign activity classes 504.

In a specific example, the confidence level can be a numerical value that first machine learning model 116 can include in each prediction. In another example, samples may be placed within a class based on a class probability calculated by first machine learning model 116. For instance, a labeled sample 510 is placed in benign activity class 504. Accordingly, samples that are similar to labeled sample 510 can be placed nearby in benign activity class 504. In another example, first machine learning model 116 may place an unlabeled sample 508 based on a calculated confidence level or class probability. In this instance, first machine learning model 116 has determined that unlabeled sample 508 likely belongs in benign activity class 504 and has placed unlabeled sample 508. However, first machine learning model 116 may also determine that unlabeled sample 508 could potentially belong in malicious activity class 502A (e.g., benign activity class 504 and malicious activity class 502A have similar class probabilities). Accordingly, unlabeled sample 508 is placed near decision boundary 506. In another example, first machine learning model 116 may calculate a class probability for each activity class 502-504 for a sample. Once each class probability is calculated, first machine learning model 116 can rank the class probabilities and place the sample in the activity class 504 with the highest associated class probability.

When calculating class probabilities for a command line string 202, first machine learning model 116 can consider various weights, biases, and features of the command line string. In a specific example, first machine learning model 116 can be a linear logistic regression classifier and calculate class probabilities using the following equation where d is the number of features (e.g., the number of terms 206), $w_j$ is the weight for a particular feature, x is the command line string in question, and b is the bias:

$$P(\text{class}) = 1 \bigg/ \left(1 + \exp\left(\sum_{j=1}^{d} w_j x + b\right)\right)$$

In another example, first machine learning model 116 may be a boosted decision tree classifier which is a non-linear model. By employing a variety of machine learning models, the system 100 enables experimentation with different approaches. In this way, an organization can quickly determine a method for training and detection of malicious command line strings 202 that best suits each situation.

As shown in FIG. 5B, once first machine learning model 116 has been trained using labeled data set 104 and placed each sample in decision space 500, the placed samples can be further analyzed by first machine learning model 116 and second machine learning model 117. In various examples, first machine learning model 116 can generate an uncertainty score for each sample while second machine learning model 117 can calculate a class distribution 512 as well as an anomaly score for each sample. Class distribution 512 can enable second machine learning model 117 to determine a mean cluster of samples within an activity class (e.g., benign activity class 504) as well as a probability that an unlabeled sample 508 belongs in the predicted activity class. In various examples, a class distribution 512A may be calculated by second machine learning model 117 using a different approach from first machine learning model 116 when classifying samples as discussed above. For instance, second machine learning model 117 may utilize a Naïve Bayes model to analyze decision space 500 which can approximate a Gaussian distribution. However, it should be understood that class distribution 512A can be calculated using any suitable method such as by applying a standard statistical model.

As mentioned, second machine learning model 117 can generate an anomaly score for each sample that is calculated based on a likelihood that the sample belongs in the predicted class. A sample's anomaly score can, of course, represent how anomalous a particular sample is relative to class distribution 512A. For instance, samples that fall within class distribution 512A may have a low anomaly score. Conversely, samples that fall far away from the average represented by class distribution 512A may have a high anomaly score.

In addition, first machine learning model 116 can calculate an uncertainty score for each sample. As discussed above with respect to unlabeled sample 508, a sample may have similar class probabilities for multiple activity classes 502-504. In various examples, the uncertainty score can represent a difference between a highest ranked class probability and a second-highest ranked class probability for a sample. For instance, a high uncertainty score can represent a small difference between the highest and second-highest class probabilities such as with unlabeled sample 508. Conversely, samples with low uncertainty scores can be close to the mean cluster of samples within class distribution 512A.

By calculating an uncertainty score and an anomaly score for each sample, first machine learning model 116 and second machine learning model 117 can further enable first machine learning model 116 to categorize samples within each activity class 502-504 using activity class legend 514. Activity class legend 514 can define several types of activity classes such as benign 514A and malicious 514B. As will be discussed below, activity class legend 514 can also be expanded with new activity classes as first machine learning model 116 continually learns. For instance, second machine learning model 117 may discover a new type of malicious command line string as enabled by anomaly sampling which can be subsequently recorded in activity class legend 514. In addition, activity class legend 514 can also record new types of benign activity, both new classes as well as subclasses of known benign activity.

Using activity class legend 514, first machine learning model 116 and second machine learning model 117 can detect samples for inclusion in selected samples 120 as uncertain samples 122 or anomalous samples 124 for further analysis. In various examples, first machine learning model 116 and second machine learning model 117 can utilize various approaches to select samples for analyst 126. For instance, a sample with a high anomaly score and a low uncertainty score may be identified as an anomalous sample 124A. Similarly, a sample with an uncertainty score that is higher than its anomaly score may be identified as an uncertain sample 122B. Second machine learning model 117 can then provide analyst 126 with anomalous samples 124 as they may require more urgency before moving on to uncertain samples 122 provided by first machine learning model 116. Alternatively, first machine learning model 116 may prioritize uncertain samples 122 for analysis to improve accuracy of machine learning model 116 for classifying samples retrieved from unlabeled data set 118.

In another example, the system 100 may utilize the outputs (e.g., decision space 500) of first machine learning model 116 and second machine learning model 117 to rank the uncertainty scores and anomaly scores for collected samples within an activity class 502A. First machine learning model 116 and second machine learning model 117 can then select a sample with the highest ranked anomaly score (e.g., the most anomalous) and a sample with the highest ranked uncertainty score (e.g., the most uncertain) for analysis. This process can be iteratively repeated for each activity class 502-504. In this way, first machine learning model 116 and second machine learning model 117 can provide analyst 126 with selected samples 120 that give complete view of activity classes at a computing system while prioritizing the most anomalous and uncertain samples.

As mentioned above, analyst 126 can perform additional analysis on selected samples 120 to properly label uncertain samples 122 as well as classify anomalous samples 124. As shown in FIG. 5C, uncertain samples 122A and 122B and anomalous samples 124A and 124B are now replaced with shading to indicate malicious samples while anomalous sample 124C is shown to be benign. In a specific example, in response to input by analyst 126, uncertain sample 122B is now new malicious sample 516A and decision boundary 506 has shifted such that new malicious sample 516A lies within malicious activity class 502A. In addition, new malicious sample 516A can be added to labeled data set 104 for enabling system 100 to improve accuracy in identifying malicious command line strings 202.

Furthermore, as shown in FIG. 5C, by including anomalous samples 124 in selected samples 120, first machine learning model 116 and second machine learning model 117 can enable analyst 126 to discover new malicious activity classes 502. For instance, anomalous sample 124A is now labeled as new malicious sample 516B in response to input by analyst 126. However, analyst 126 may also indicate that new malicious sample 516B belongs to a new malicious activity class 502C that is different from but related to malicious activity class 502A. In a specific example, command line inputs in malicious activity class 502A may generally exploit a program for managing permissions to carry out an attack. Similarly, command line inputs in new malicious activity class 502C may also exploit the permissions program but specifically for performing remote code execution. Accordingly, decision space 500 can be updated with new decision boundary 518A to indicate that new malicious activity class 502C is a more specific type of malicious activity class 502A.

In another example, analyst 126 may notice that new malicious sample 516B originates from a specific attacker or threat actor group. Accordingly, analyst 126 can assign the attacker a new malicious activity class 502C demarcated by new decision boundary 518. Furthermore, the attacker in question may exhibit a certain pattern across several malicious activity classes 502. For example, the attacker may tend to utilize the same path, filenames, registry keys and so forth while exploiting various programs. With input from analyst 126 to labeled data set 104, first machine learning model 116 can learn to notice the pattern across several malicious activity classes 502 and prevent future attacks. In this way, additional malicious activity classes 502 can be created to reflect more specific or granular versions of broader malicious activity classes and enable effective prevention of specific types of attacks or attackers.

In still another example, based on input from analyst 126, anomalous sample 124B is now labeled new malicious sample 516C. While originally identified by second machine learning model 117 as an anomalous sample 124, analyst 126 may confirm that anomalous sample 124B in fact belongs to malicious activity class 502B despite differing from class distribution 512B as illustrated in FIG. 5B. Accordingly, new malicious sample 516C can remain placed within malicious activity class 502B and is not demarcated within a new decision boundary 518.

Figure 6:
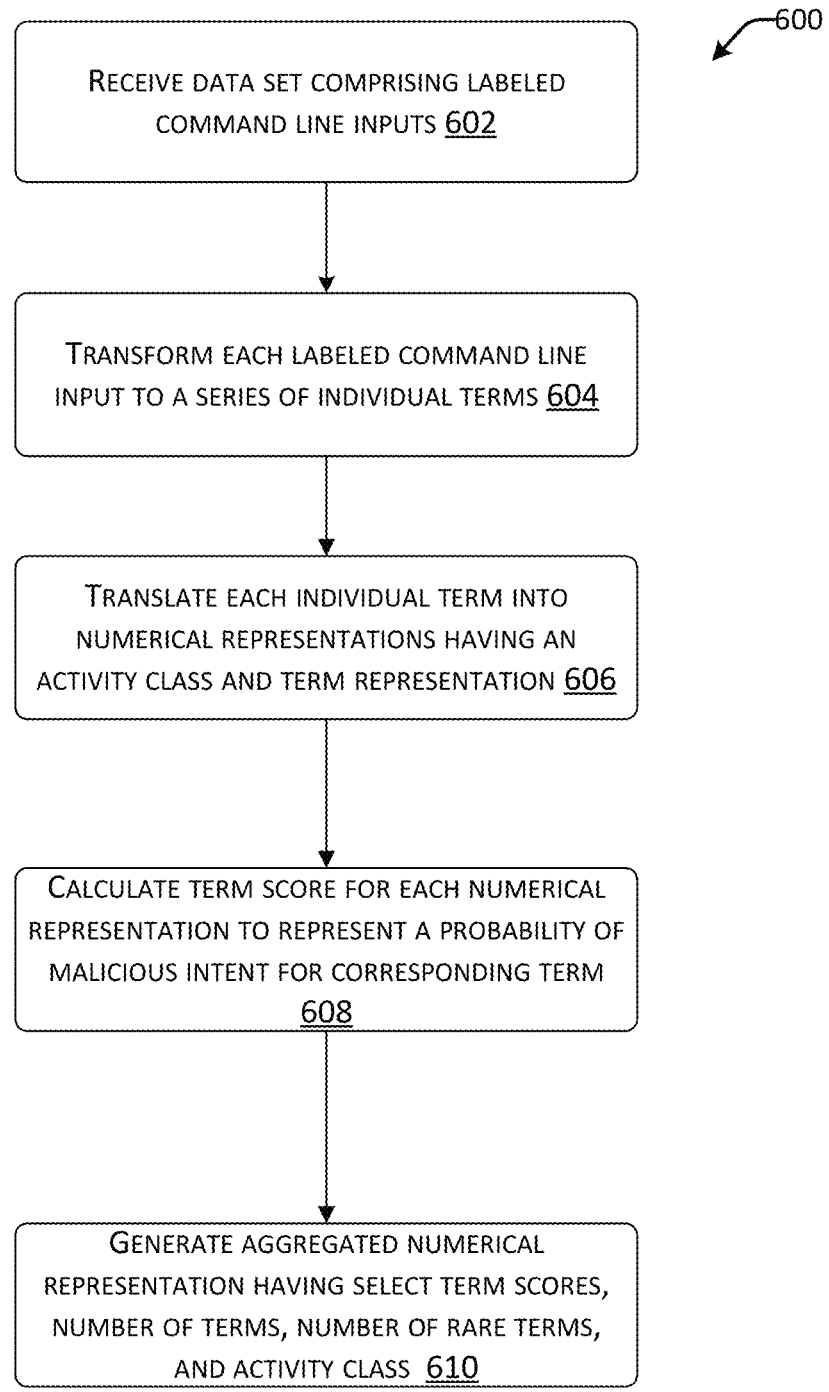
FIG. 6 is a flow diagram of an example method for analyzing command line strings to detect malicious inputs.

Turning now to FIG. 6, aspects of a routine for enabling a system 100 to learn and detect malicious command line strings 202 are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 6, routine 600 begins at operation 602 where the system receives a data set comprising labeled command line inputs. As discussed above, labeled data set 104 can include command line strings that are known to be malicious or benign. In addition, the labeled data set can be manually prepared by an analyst as well as include data from previous iterations of command line inputs processed by the system.

Next at operation 604, each labeled command line is transformed into a series of individual terms. As discussed, a term can be any substring of a command line string that is separated by delimiters such as a comma, semicolon, and so forth. For instance, a term may be a name of a program, a number, a file extension, and the like. In addition, an individual term may also be referred to as a word or a token.

Proceeding to operation 606, each individual term is then translated into a corresponding numerical representation that includes an activity class as well as a term representation. As discussed above, an activity class can indicate what type of program the associated command line input is attempting to execute. In addition, a term representation can be a numerical representation of the natural language text of a specific term. In various examples, the system can also account for surrounding terms to embed context within each term representation. In a specific example, numerical representations and term representations can be implemented as vectors (e.g., a word vector or a token vector) to numerically represent individual terms.

Next at operation 608, the system calculates a term score for each numerical representation that represents a probability that the corresponding term is malicious. It should be understood that term scores can be calculated with any suitable method. For example, a particular term may be benign when utilized in the context of one activity class but malicious in the context of another activity class. Furthermore, term scores can be updated over time as the system analyzes more command line inputs and encounters more instances of a particular term.

Finally at operation 610, the system generates an aggregated numerical representation to represent the full sequence of terms for a certain command line input. The aggregated numerical representation can include a select number of term scores, a number of terms, a number of rare terms, and the activity class. In addition, the aggregated numerical representation can also include values derived from analysis of the term representations such as a minimum, maximum, and average term value. In addition, the average term values can be calculated as a weighted average using the term scores to emphasize terms that are more likely to be malicious. An aggregated numerical representation may also be referred to as an aggregated feature vector. Similar to word vectors, the aggregated numerical representation can be a numerical vector that represent various aggregated features of a given command line string.

Figure 7:
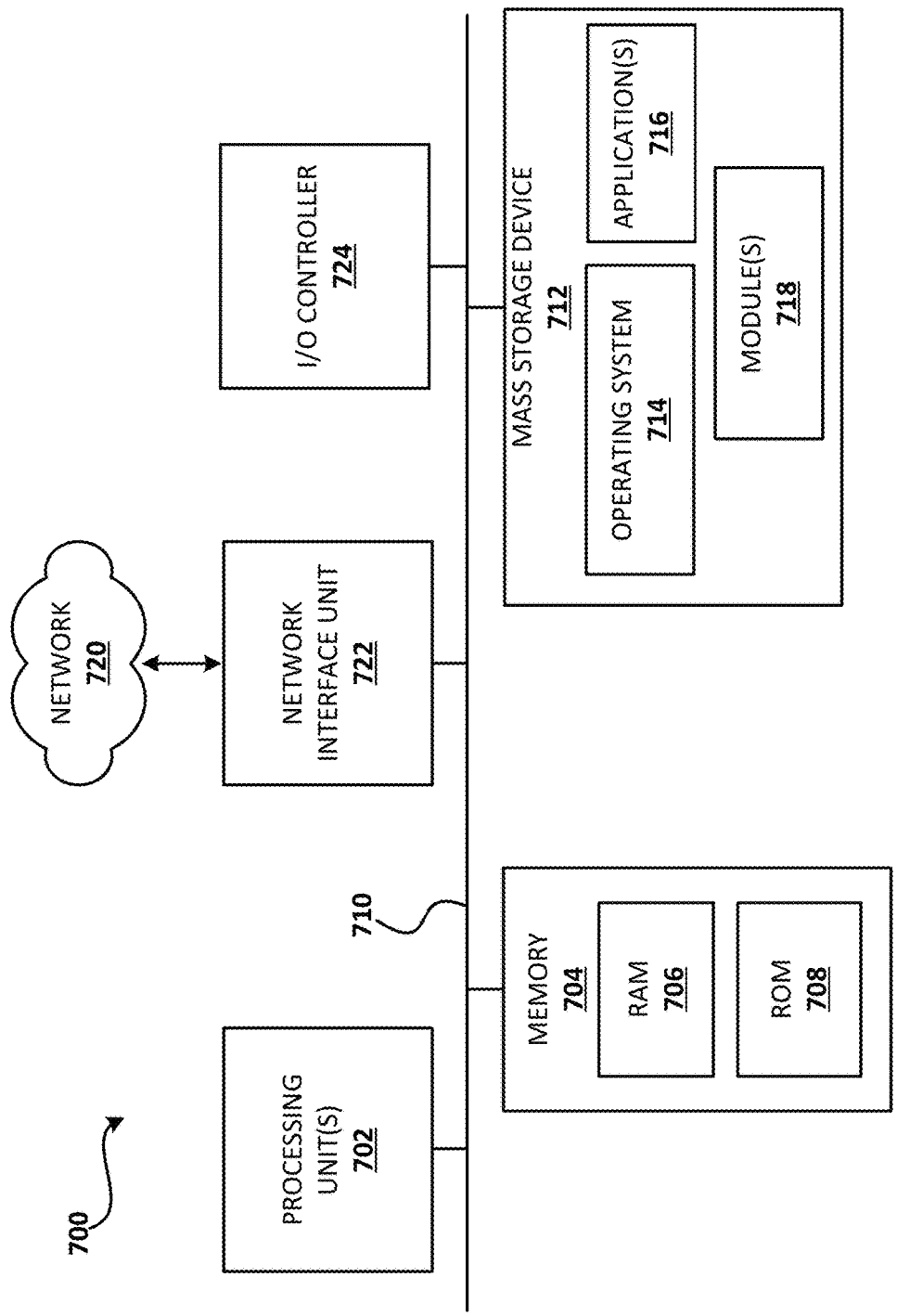
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the system 100, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 708 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a method comprising: receiving a data set comprising a plurality of labeled command line inputs; transforming each of the labeled command line inputs to generate a sequence of individual terms; translating each of the sequences of individual terms into a sequence of numerical representations comprising an activity class and a term representation, where individual terms correspond to individual numerical representations; calculating a term score for each of the numerical representations based on the numerical representation that represents a probability of malicious intent for the corresponding individual term; and generating an aggregated numerical representation comprising at least one of a select number of term scores, a number of terms, a number of rare terms, and the activity class to identify a malicious command line input.

In one embodiment of Example Clause A, the aggregated numerical representation can comprise at least two of a select number of term scores, a number of terms, a number of rare terms, and the activity class. In another embodiment, the aggregated numerical representation can comprise at least three of a select number of term scores, a number of terms, a number of rare terms, and the activity class. In still another embodiment, the aggregated numerical representation can comprise any combination of a select number of term scores, a number of terms, a number of rare terms, and the activity class. This can also apply to Example Clauses B through T herein.

Example Clause B, the method of Example Clause A wherein the select number of term scores are selected based on a threshold term score.

Example Clause C, the method of Example Clause A or Example Clause B, wherein a malicious command line input is identified when the number of terms exceeds a threshold number of terms.

Example Clause D, the method of any one of Example Clauses A through C, wherein a malicious command line input is identified when the number of rare terms exceeds a threshold number of rare terms.

Example Clause E, the method of any one of Example Clauses A through D, wherein a malicious command line input is identified when the activity class matches a predetermined activity class.

Example Clause F, the method of any one of Example Clauses A through E, further comprising: providing the aggregated numerical representation to a machine learning model; and training the machine learning model using the aggregated numerical representation to identify an activity class for a plurality of unlabeled command line inputs.

Example Clause G, the method of Example Clause F, wherein training the machine learning model comprises: selecting a set of command line inputs from the plurality of unlabeled command line inputs; labeling each command line input of the set of command line inputs by a user input to generate additional labeled command line inputs; and adjusting at least one of a term score, a threshold number of term scores, a threshold number of terms, or a threshold number or rare terms based on the labeled command line inputs.

Example Clause H, the method of any one of Example Clauses A through F, determining a subclass that is associated with the activity class, comprising at least one of a malicious entity, an attack type, or a usage type.

Example Clause I, the method of any one of Example Clauses A through F and H, further comprising: determining a plurality of anomaly scores for a plurality of command line inputs to represent a distance from a mean sample cluster within a decision boundary; ranking the plurality of command line inputs based on the plurality of anomaly scores; and selecting a command line input having a greatest anomaly score to determine an activity subclass that is different from the activity class.

Example Clause J, a system comprising: one or more processing units; and a computer-readable medium having encoded thereon computer-readable instructions, that when executed by the one or more processing units cause the system to: receive a data set comprising a plurality of labeled command line inputs; transform each of the labeled command line inputs to generate a sequence of individual terms; translate each of the sequences of individual terms into a sequence of numerical representations comprising an activity class and a term representation, where individual terms correspond to individual numerical representations; calculate a term score for each of the numerical representations based on the numerical representation that represents a probability of malicious intent for the corresponding individual term; and generate an aggregated numerical representation comprising at least one of a select number of term scores, a number of terms, a number of rare terms, and the activity class to identify a malicious command line input.

Example Clause K, the system of Example Clause J wherein the select number of term scores are selected based on a threshold term score.

Example Clause L, the system of Example Clause J or Example Clause K, wherein a malicious command line input is identified when the number of terms exceeds a threshold number of terms.

Example Clause M, the system of any one of Example Clauses J through L, wherein the computer-readable instructions further cause the one or more processing units to: provide the aggregated numerical representation to a machine learning model; and train the machine learning model using the aggregated numerical representation to identify an activity class for a plurality of unlabeled command line inputs.

Example Clause N, the system of Example Clause M wherein the computer-readable instructions further cause the one or more processing units to: select a set of command line inputs from the plurality of unlabeled command line inputs; label each command line input of the set of command line inputs by a user input to generate additional labeled command line inputs; and adjust at least one of a term score, a threshold number of term scores, a threshold number of terms, or a threshold number or rare terms based on the labeled command line inputs.

Example Clause O, the system of any one of Example Clauses J through M wherein the computer-readable instructions further cause the one or more processing units to: determine a plurality of anomaly scores for a plurality of command line inputs to represent a distance from a mean sample cluster within a decision boundary; rank the plurality of command line inputs based on the plurality of anomaly scores; and select a command line input having a greatest anomaly score to determine an activity subclass that is different from the activity class.

Example Clause P, a computer-readable storage medium having encoded thereon computer-readable instructions to cause one or more processing units to: receive a data set comprising a plurality of labeled command line inputs; transform each of the labeled command line inputs to generate a sequence of individual terms; translate each of the sequences of individual terms into a sequence of numerical representations comprising an activity class and a term representation, where individual terms correspond to individual numerical representations; calculate a term score for each of the numerical representations based on the numerical representation that represents a probability of malicious intent for the corresponding individual term; and generate an aggregated numerical representation comprising at least one of a select number of term scores, a number of terms, a number of rare terms, and the activity class to identify a malicious command line input.

Example Clause Q, the computer-readable storage medium of Example Clause P, wherein a malicious command line input is identified when the number of terms exceeds a threshold number of terms.

Example Clause R, the computer-readable storage medium of Example Clause P or Example Clause Q wherein the computer-readable instructions further cause the one or more processing units to: provide the aggregated numerical representation to a machine learning model; and train the machine learning model using the aggregated numerical representation to identify an activity class for a plurality of unlabeled command line inputs.

Example Clause S, the computer-readable storage medium of any one of Example Clauses P through R wherein the computer-readable instructions further cause the one or more processing units to: provide the aggregated numerical representation to a machine learning model; and train the machine learning model using the aggregated numerical representation to identify an activity class for a plurality of unlabeled command line inputs.

Example Clause T, the computer-readable storage medium of Example Clause S wherein the computer-readable instructions further cause the one or more processing units to: select a set of command line inputs from the plurality of unlabeled command line inputs; label each command line input of the set of command line inputs by a user input to generate additional labeled command line inputs; and adjust at least one of a term score, a threshold number of term scores, a threshold number of terms, or a threshold number or rare terms based on the labeled command line inputs.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   receiving a data set comprising a plurality of labeled command line inputs;
   transforming each of the labeled command line inputs to generate a sequence of individual terms;
   translating each of the sequences of individual terms into a sequence of numerical representations comprising an activity class and a term representation, where individual terms correspond to individual numerical representations, wherein the activity class indicates that a program that is attempting to execute with respect to a term associated with the term representation;
   using the activity class to calculate a term score for each of the individual numerical representations based on the individual numerical representations that represents a probability of malicious intent for the corresponding individual term;
   generating an aggregated numerical representation comprising at least one of a select number of term scores, a number of terms, a number of rare terms, and the activity class; and
   identifying a malicious command line input based on the aggregated numerical representation.

2. The method of claim 1 wherein the select number of term scores are selected based on a threshold term score.

3. The method of claim 1, wherein the malicious command line input is identified when the number of terms exceeds a threshold number of terms.

4. The method of claim 1, wherein the malicious command line input is identified when the number of rare terms exceeds a threshold number of rare terms.

5. The method of claim 1, wherein the malicious command line input is identified when the activity class matches a predetermined activity class.

6. The method of claim 1 further comprising:
   providing the aggregated numerical representation to a machine learning model; and
   training the machine learning model using the aggregated numerical representation to identify an activity class for a plurality of unlabeled command line inputs.

7. The method of claim 6, wherein training the machine learning model comprises:
   selecting a set of command line inputs from the plurality of unlabeled command line inputs;
   labeling each command line input of the set of command line inputs by a user input to generate additional labeled command line inputs; and
   adjusting at least one of a term score, a threshold number of term scores, a threshold number of terms, or a threshold number or rare terms based on the labeled command line inputs.

8. The method of claim 1 further comprising:
   determining a subclass that is associated with the activity class, comprising at least one of a malicious entity, an attack type, or a usage type.

9. The method of claim 1 further comprising:
   determining a plurality of anomaly scores for a plurality of command line inputs to represent a distance from a mean sample cluster within a decision boundary;
   ranking the plurality of command line inputs based on the plurality of anomaly scores; and
   selecting a command line input having a greatest anomaly score to determine an activity subclass that is different from the activity class.

10. A system comprising:
    one or more processing units; and
    a computer-readable device having encoded thereon computer-readable instructions, that when executed by the one or more processing units cause the system to:
       receive a data set comprising a plurality of labeled command line inputs;
       transform each of the labeled command line inputs to generate a sequence of individual terms;
       translate each of the sequences of individual terms into a sequence of numerical representations comprising an activity class and a term representation, where individual terms correspond to individual numerical representations, wherein the activity class indicates that a program that is attempting to execute with respect to a term associated with the term representation;
       use the activity class to calculate a term score for each of the individual numerical representations based on the individual numerical representation that represents a probability of malicious intent for the corresponding individual term;
       generate an aggregated numerical representation comprising at least one of a select number of term scores, a number of terms, a number of rare terms, and the activity class; and
       identify a malicious command line input based on the aggregated numerical representation.

11. The system of claim 10 wherein the select number of term scores are selected based on a threshold term score.

12. The system of claim 10, wherein the malicious command line input is identified when the number of terms exceeds a threshold number of terms.

13. The system of claim 10, wherein the computer-readable instructions further cause the one or more processing units to:
    provide the aggregated numerical representation to a machine learning model; and
    train the machine learning model using the aggregated numerical representation to identify an activity class for a plurality of unlabeled command line inputs.

14. The system of claim 13, wherein the computer-readable instructions further cause the one or more processing units to:
    select a set of command line inputs from the plurality of unlabeled command line inputs;
    label each command line input of the set of command line inputs by a user input to generate additional labeled command line inputs; and adjust at least one of a term score, a threshold number of term scores, a threshold number of terms, or a threshold number or rare terms based on the labeled command line inputs.

15. The system of claim 10, wherein the computer-readable instructions further cause the one or more processing units to:
   determine a plurality of anomaly scores for a plurality of command line inputs to represent a distance from a mean sample cluster within a decision boundary;
   rank the plurality of command line inputs based on the plurality of anomaly scores; and
   select a command line input having a greatest anomaly score to determine an activity subclass that is different from the activity class.

16. A computer-readable storage device having encoded thereon computer-readable instructions to cause one or more processing units to:
   receive a data set comprising a plurality of labeled command line inputs;
   transform each of the labeled command line inputs to generate a sequence of individual terms;
   translate each of the sequences of individual terms into a sequence of numerical representations comprising an activity class and a term representation, where individual terms correspond to individual numerical representations, wherein the activity class indicates that a program that is attempting to execute with respect to a term associated with the term representation;
   use the activity class to calculate a term score for each of the individual numerical representations based on the individual numerical representation that represents a probability of malicious intent for the corresponding individual term;
   generate an aggregated numerical representation comprising at least one of a select number of term scores, a number of terms, a number of rare terms, and the activity class; and
   identify a malicious command line input based on the aggregated numerical representation.

17. The computer-readable storage medium of claim 16, wherein the malicious command line input is identified when the number of terms exceeds a threshold number of terms.

18. The computer-readable storage medium of claim 16, wherein the computer-readable instructions further cause the one or more processing units to:
   provide the aggregated numerical representation to a machine learning model; and
   train the machine learning model using the aggregated numerical representation to identify an activity class for a plurality of unlabeled command line inputs.

19. The computer-readable storage medium of claim 16, wherein the computer-readable instructions further cause the one or more processing units to:
   provide the aggregated numerical representation to a machine learning model; and
   train the machine learning model using the aggregated numerical representation to identify an activity class for a plurality of unlabeled command line inputs.

20. The computer-readable storage medium of claim 19, wherein the computer-readable instructions further cause the one or more processing units to:
   select a set of command line inputs from the plurality of unlabeled command line inputs;
   label each command line input of the set of command line inputs by a user input to generate additional labeled command line inputs; and
   adjust at least one of a term score, a threshold number of term scores, a threshold number of terms, or a threshold number or rare terms based on the labeled command line inputs.

* * * * *